May 18, 1943 D. W. HAMM 2,319,454
PISTON RING
Filed Nov. 19, 1941
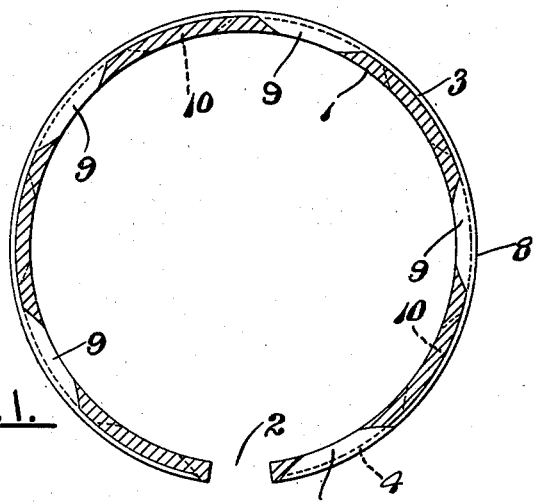
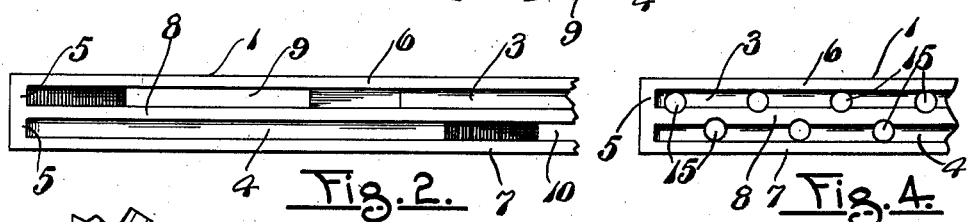
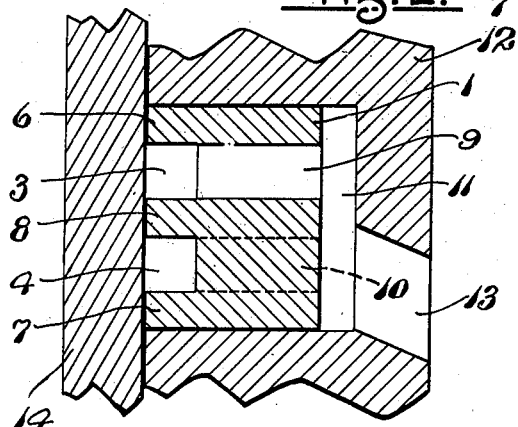
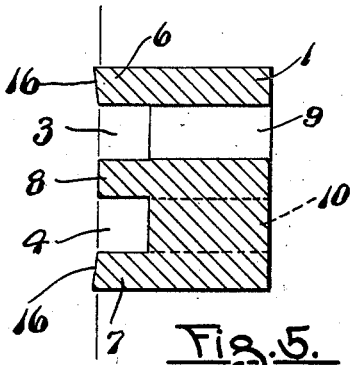
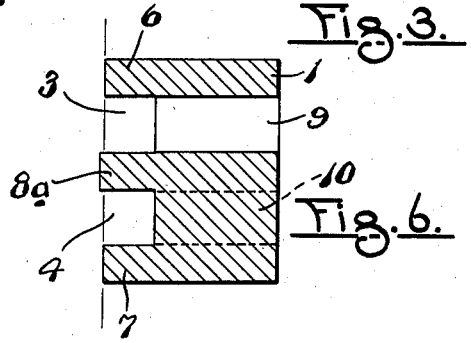
Inventor
Douglas W. Hamm
By Liverance and
Van Antwerp
Attorneys Patented May 18, 1943

2,319,454

UNITED STATES PATENT OFFICE 2,319,454

PISTON RING

Douglas W. Hamm, Muskegon, Mich., assignor to Muskegon Piston Ring Company, Muskegon, Mich., a corporation of Michigan Application November 19, 1941, Serial No. 419,694

1 Claim. (Cl. 309—45)

This invention relates to piston rings of metallic character, designed for use in internal combustion engines. It is an object and purpose of the present invention to provide a piston ring of novel construction by means of which the pressure of the ring against the cylinder wall may be reduced yet oil saved and conserved and an exceptionally good seal made against the passage of products of combustion or fuel mixture past the piston to the engine crankcase. Further, the piston ring of my invention has the quality of a substantially uniform pressure engagement against the walls of the cylinder without high points or zones of pressure around the ring. It is also a further object of the invention to provide a piston ring which may be worn in quickly and easily, and in which a central cylinder engaging rib or land may be varied in width for engaging the cylinder wall for different conditions to be served. These and many other objects and purposes and structure for attaining the same will be understood from the following description, taken in connection with the accompanying drawing, in which, Fig. 1 is a horizontal section through a piston ring made in accordance with my invention.

Fig. 2 is a fragmentary enlarged edge view thereof.

Fig. 3 is a fragmentary vertical section showing the piston ring of my invention as it is installed in use in the ring groove of a piston.

Fig. 4 is a view similar to Fig. 2 showing a modified form or type of construction.

Fig. 5 is an enlarged transverse section of the piston ring showing its upper and lower cylinder engaging lands of beveled form and extending out slightly farther than the central rib or land, and Fig. 6 is a view similar to Fig. 5 in which the central rib or land is slightly larger in diameter than the side lands.

Like reference characters refer to like parts in the different figures of the drawing.

The piston ring 1 is made from a single ring casting which is parted at 2 at one side, the ring when closed taking a substantially circular form. In the outer bearing face of the ring spaced upper and lower grooves 3 and 4 are cut reaching nearly from one end of the ring to the other, preferably terminating slightly short at the ends of the ring at the parting as indicated at 5. However, the blocking off of the grooves adjacent the parting as indicated at 5 need not necessarily be used.

The upper and lower grooves 3 and 4 extending part way through the ring provide an upper rib or cylinder engaging land 6, a lower cylinder engaging land 7, and an intermediate land 8 between the grooves. Slots 9 and 10 are cut through the ring, the upper slots 9 extending inwardly through the ring from the bottom of the upper groove 3 and the lower slots 10 from the bottom of the lower groove 4. The upper sides of the slots 9 are flush with the under side of the upper ring land 6 and at their lower sides may be flush with the upper side of the intermediate land 8 or, as is used at times, the slots 9 may be wider than the groove 3 so as to remove parts of the central rib or land 8. Similarly the slots 10 at their lower sides are flush with the lower side of the rib 7 and may be flush with the under side of the central rib or land 8 or be extended upwardly into said central land. The slots 10 in the lower part of the ring are disposed between two consecutive upper slots 9 and, away from the ends of the ring, said slots 9 are likewise each disposed between two spaced apart lower slots 10. That is, the slots 9 and 10 are in alternate or staggered relationship around the ring.

The ring is adapted to be located in a ring groove 11 of a piston 12 from the inner lower portion of which ring groove drainage passages 13 for oil are made to the interior of the piston. The ring being closed at the parting, its tendency to spring outwardly presses the outer faces or edges of the lands 6, 7 and 8 against the inner walls of the piston 14. Oil is collected in both grooves 3 and 4 and drains therethrough to the back of the piston groove 11 and excess oil is drained through the passages 13 to the interior of the piston.

A ring as thus constructed has an abundant ventilation for the passing of oil therethrough. It may be made larger than shown in Fig. 3 by widening the slots 9 and 10 and narrowing the intermediate land 8. The grooves 3 and 4 cover substantially the entire surface of the cylinder, collect the oil and pass it to the slots 9 and 10, the oil flowing around the ring in such grooves until said slots are reached. The tension of the ring is very closely uniform throughout avoiding high zones of pressure with intermediate zones of low pressure at the bearing land surfaces of the ring against the cylinder wall. It has been found that with this ring the unit pressure as measured may be reduced to practically 90 pounds per square inch as against comparative rings for the same purpose having 185 pounds per square inch without diminishing the oil saving and conserving functions of the ring. This helps markedly in saving the inner walls of the cylinder from excessive wear or scoring.

In Fig. 4 the slots 9 and 10 are replaced by a large number of drilled openings 15 radially made through the ring, upper openings 15 leading from the upper slot 3 and lower openings from the lower slot 4 therethrough. The circular openings 15 in the two slots are in alternate or staggered relation as shown in Fig. 4. The functions of the ring are substantially the same as described with reference to the preferred form of construction shown in Fig. 2.

In Fig. 5 the external diameter of the intermediate land 8 is slightly less than the side lands 6 and 7 at the upper and lower corners respectively thereof, but is the same as at the lower and upper corners respectively of said lands. This provides beveled lands 16 which first engage the cylinder wall when the ring is new at the upper and lower outer corners respectively of said side lands. The corners are worn first and when the ring is fully seated the beveled surfaces are worn down to straight surfaces in the same plane and flush with the outer bearing surface of the intermediate land 8. In Fig. 6 the intermediate land is of slightly larger diameter than the side lands so that it first engages the cylinder walls when the ring is new, is worn rapidly and the ring thereupon seats against the cylinder wall quickly so that there is a quick wearing-in of the ring. Both of the forms shown in Figs. 5 and 6 provide quick wearing-in with the advantages which come therefrom.

The invention has proved particularly practical and useful. The rings are readily and economically manufactured and upon extensive tests have proven exceptionally useful. It is of course to be understood that other variations in form may be utilized without departing from the invention. For example, the grooves at 3 and 4 need not be rectangular in cross section. They may be of a trapezoidal form or arc-shaped in form without in any respect changing the invention.

The invention is defined in the appended claim and is to be considered comprehensive of all forms of structure coming within its scope.

I claim:

A parted piston ring having two annular grooves therearound, one below its upper side and one above its lower side to provide upper and lower bearing lands, said lands having bevelled form, said grooves being spaced and separated from each other to provide a bearing land between the grooves, said last mentioned land having a diameter slightly less than that of the other bearing lands, all of said lands being of approximately the same width, said ring having elongated ventilating slots cut radially therethrough from each of said grooves to the inner curved side of the piston ring, consecutive slots in each of the grooves being spaced from each other a distance greater than the length of a slot, and the slots in the two grooves being located in alternate staggered relation to each other and having adjacent ends in close proximity to each other, the upper sides of the slots in the upper groove of the piston ring being in the same plane with the upper side of the upper groove and the lower sides of the slots in the lower groove being in the same plane with the lower side of the lower groove in said ring.

DOUGLAS W. HAMM.